United States Patent Office 2,795,525
Patented June 11, 1957

2,795,525

METHOD OF ERADICATING NEMATODES BY APPLYING THERETO SULFENYL XANTHATES

Roy E. Stansbury and Lyle D. Goodhue, Bartlesville, Okla., assignors to Phillips Petroleum Company, a corporation of Delaware No Drawing. Application November 20, 1952, Serial No. 321,729

9 Claims. (Cl. 167—22)

This invention relates to nematocidal compositions. In one aspect the invention relates to a method of eliminating nematodes from materials containing the same. In another aspect the invention relates to a method for treating soil to eradicate nematodes therein. In another aspect the invention relates to a novel nematocidal composition of matter.

Nematodes are a class of unsegmented worms belonging to the phylum Nemathelminthes. Certain forms mainly belonging to the genera Heterodera and Anguillulina (Tylenchus) are agricultural pests. These nematodes attack the roots, stems, leaves or ears of cultivated plants of various kinds, and may cause great deterioration or even destruction of the crop.

According to this invention, there is provided a novel nematocidal composition comprising a compound selected from the group consisting of alkyl substituted sulfenyl xanthates and alkyl substituted thiosulfenyl xanthates admixed with a carrier material. The sulfenyl and thiosulfenyl xanthates applicable to use in the present invention are represented by the formula:

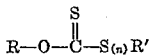

wherein R can be an alkyl group containing one or two carbon atoms, R' can be an alkyl group containing from one to ten carbon atoms and $n$ is an integer selected from the group of 2 and 3. Typical sulfenyl and thiosulfenyl xanthates applicable to use in the present invention include O-methyl-S-tert-butyl-sulfenyl xanthate, O-ethyl-S-tert-butylsulfenyl xanthate, O-ethyl-S-tert-butylthiosulfenyl xanthate, O-methyl-S-tert-butylthiosulfenyl xanthate, and O-ethyl-S-dodecylthiosulfenyl xanthate. These compounds are known in the art. One suitable method for their preparation by the interaction of alkylsulfenyl halides and alkylthiosulfenyl halides with alkali metal salts of alkyl xanthic acids is disclosed, in U. S. Patent 2,574,829 (1951), by C. M. Himel and L. O. Edmonds.

Further in accordance with this invention there is provided a method of eliminating nematodes from a material containing the same by treating said material with a composition of matter comprising a compound selected from the group consisting of alkyl substituted sulfenyl xanthates and alkyl substituted thiosulfenyl xanthates.

The sulfenyl and thiosulfenyl xanthates of this invention are employed in the form of dispersions in a liquid or a solid carrier. Thus, the compounds can be employed in solution in a suitable solvent, as subsequently described, or in the form of an aqueous emulsion. The compounds can also be employed in admixture with a solid carrier so that the compositions can be applied by the well-known dusting methods. Suitable solid carriers are pumice, talc and clay.

The compounds used in the present invention can be employed, for treating soils, as solutions in solvents which do not have deleterious effects on said compounds and which do not leave appreciable amounts of toxic residues in the soil. Suitable solvents include selected isoparaffinic hydrocarbon fractions known commercially as Soltrols, straight chain hydrocarbons containing not more than 12 carbon atoms, naphthas, kerosene and the like. The solvents employed boil in a temperature range from 150 to 400° F., preferably from 200 to 300° F. Isoparaffinic solvents, produced by alkylation of an isoparaffin with an olefin, in the presence of hydrofluoric acid as a catalyst, to produce an isoparaffin, are useful. Thus, a heavy, isoparaffinic hydrocarbon fraction produced by the alkylation of an isoparaffin with an olefin in the presence of a hydrofluoric acid catalyst is a desirable solvent adjuvant. These isoparaffinic solvents are the isoparaffinic hydrocarbon materials known as "Soltrols."

Solutions prepared according to the manner of the present invention will contain our nematocides on a weight basis of from 1 to 20 percent. The solutions will be applied to the soil in any suitable manner at a rate to provide from about 10 to about 60 pounds of active ingredient per acre. However, when fumigating soil containing undecomposed plant materials infested with galls of the root-knot nematode, it is frequently favorable to use a sufficient amount of solution to provide as much as 75 pounds or more of active ingredient per acre, e. g. up to 100 pounds per acre. A very satisfactory method according to the present invention is to inject the nematocidal compositions of this invention into a soil, which may be natural or artifical. This can be accomplished by directing the compositions of the invention in to holes or other openings in the soil in the amounts specified above.

Aqueous emulsions of compounds used in the present invention can be employed where it is desirable to drench soil such as in greenhouse benches and the like. Said emulsions can be of the same concentrations as those specified for the solutions described. However, when employing emulsions it will be desirable to employ lower concentrations, say for example, in the range from about 1 to 15, preferably 5 to 10 weight percent of active ingredient, and completely wet the soil with said emulsions.

The materials of the present invention are applicable to the destruction of the nematode species *Rhabditis strongyloids, Panagrellus redivivius,* the Golden Nematode, *Heterodera rostotchinensis, Heterodera marioni* (Meloidogyne species), and others.

EXAMPLE

*Emulsion tests of sulfenyl and thiosulfenyl xanthates against rhabditis strongyloids*

Tests were conducted wherein nematocides of the present invention were made up as 2 weight percent aqueous emulsions using 0.5 weight percent Atlox 1045A (polyoxy ethylene sorbitol oleate-laurate emulsifying agent) as emulsifier. Preliminary tests proved that Atlox 1045A was non-toxic to the test organism. These 2 percent emulsions were then diluted so that in the end there were 4 concentrations: 2.0, 0.2, 0.02 and 0.002 weight percent. One ml. of distilled water was placed in a 3⁄16 x 3″ test tube and from 25 to 50 nematodes of the species *Rhabditis strongyloids* were then transferred to the test tube with a bamboo pick. To 1 ml. of water in the test tube containing the nematodes, 1 ml. of one of the concentrations of a candidate nemotocide, prepared as described above, was added. This procedure was repeated for the three other concentrations of the compounds. Since this was a 50–50 dilution the final concentrations of the compounds were 1.0, 0.1, 0.01 and 0.001 weight percent. Each test tube was stoppered and agitated mechanically for a period of 2 hours and then a mortality count was made. Results are recorded in the following table:

| Nematocide | Percentage Mortality at Indicated Emulsion Concentration | | | |
|---|---|---|---|---|
| | 1.0% | 0.1% | 0.01% | 0.001% |
| O-ethyl-S-tert-butylsulfenyl xanthate | 60 | 38 | 20 | 0 |
| O-ethyl-S-tert-butylthiosulfenyl xanthate | 28 | 15 | 4 | 0 |

The foregoing data demonstrate that compositions prepared in accordance with this invention are effective as nematocides. Increasingly greater effectiveness is obtained when the concentration of the sulfenyl or thiosulfenyl xanthate is increased above 1 weight percent as previously described. As previously stated, satisfactory results are also obtained when the sulfenyl or thiosulfenyl xanthate is employed in solution in a hydrocarbon of the type previously described.

Variation and modification are possible within the scope of the disclosure and claims to this invention, the essence of which is that there is provided a novel nematocidal composition of matter comprising a compound having the formula:

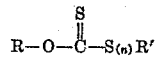

wherein R can be an alkyl group containing one or two carbon atoms, R' can be an alkyl group containing from one to ten carbon atoms and $n$ is an integer selected from the group of 2 and 3, said compound being dispersed in the carrier material; and that there is provided a method for eliminating nematodes from materials containing the same by applying the said composition of matter to said material.

We claim:

1. A method of eradicating nematodes in soil infested therewith, which method comprises applying to said soil a composition comprising a compound represented by the formula

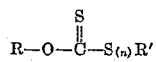

wherein R is an alkyl group having not more than two carbon atoms, R' is an alkyl group having from one to ten carbon atoms and $n$ is an integer selected from the group consisting of 2 and 3, said compound being depersed in a hydrocarbon fraction which boils in the range 150 to 400° F., the amount of said compound dispersed in said carrier being in the range 1 to 20 weight percent based on the total composition, and the amount of said composition applied to said soil being in the range 10 to 100 pounds per acre.

2. A method according to claim 1 wherein the composition is injected into the soil beneath the surface thereof.

3. A method of eradicating nematodes in soil infested therewith which comprises applying to said soil a composition comprising O-ethyl-S-tertiary-butylsulfenyl xanthate dispersed in a hydrocarbon fraction boiling in the range 150–400° F., the amount of said xanthate dispersed in said carrier being in the range 1–20 weight percent based on the total composition, and the amount of said composition applied to said soil being in the range 10–100 pounds per acre.

4. A method of eradicating nematodes in soil infested therewith which comprises applying to said soil a composition comprising O-methyl-S-tertiary-butylsulfenyl xanthate dispersed in a hydrocarbon fraction boiling in the range 150–400° F., the amount of said xanthate dispersed in said carrier being in the range 1–20 weight percent based on the total composition, and the amount of said composition applied to said boil being in the range 10–100 pounds per acre.

5. A method of eradicating nematodes in soil infested therewith which comprises applying to said soil a composition comprising O-ethyl-S-tertiary-butylthiosulfenyl xanthate dispersed in a hydrocarbon fraction boiling in the range 150–400° F., the amount of said xanthate dispersed in said carrier being in the range 1–20 weight percent based on the total composition, and the amount of said composition applied to said soil being in the range 10–100 pounds per acre.

6. A method of eradicating nemathodes in soil infested therewith which comprises applying to said soil a composition comprising O-methyl-S-tertiary-butylthiosulfonyl xanthate dispersed in a hydrocarbon fraction boiling in the range 150–400° F., the amount of said xanthate dispersed in said carrier being in the range 1–20 weight percent based on the total composition, and the amount of said composition applied to said soil being in the range 10–100 pounds per acre.

7. A method of eradicating nematodes in soil infested therewith which comprises applying to said soil a composition comprising O-ethyl-S-dodecylthiosulfenyl xanthate dispersed in a hydrocarbon fraction boiling in the range 150–400° F., the amount of said xanthate dispersed in said carrier being in the range 1–20 weight percent based on the total composition, and the amount of said composition applied to said soil being in the range 10–100 pounds per acre.

8. A method of eradicating nematodes in soil infested therewith, which method comprises applying to said soil a composition comprising a compound represented by the formula

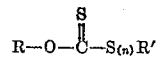

wherein R is an alkyl group having not more than two carbon atoms, R' is an alkyl group having from one to ten carbon atoms and $n$ is an integer selected from the group consisting of 2 and 3, said compound being dispersed in a liquid carrier selected from the group consisting of water and a hydrocarbon fraction which boils in the range 150 to 400° F., the amount of said compound dispersed in said carrier being in the range 1 to 20 weight percent based on the total composition, and the amount of said composition applied to said soil being in the range 10 to 100 pounds per acre.

9. A method of eradicating nemotodes in soil infested therewith, which method comprises applying to said soil a nematocidal amount of a composition comprising a compound represented by the formula

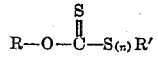

wherein R is an alkyl group having not more than two carbon atoms, R' is an alkyl group having from one to ten carbon atoms and $n$ is an integer selected from the group consisting of 2 and 3.

References Cited in the file of this patent

UNITED STATES PATENTS

| 2,574,829 | Himel et al. | Nov. 13, 1951 |
| 2,621,143 | Goodhue | Dec. 9, 1952 |

FOREIGN PATENTS

| 485,059 | Germany | Oct. 24, 1929 |

OTHER REFERENCES

Frear: Chemistry of Insecticides, Fungicides and Herbicides, 2d edition, D. Van Nostrand, Inc., New York, N. Y., 1948, pages 189 to 195.